S. F. BAUWENS.
WIREBOUND BOX MACHINE.
APPLICATION FILED MAY 29, 1919.

1,408,336.

Patented Feb. 28, 1922.
7 SHEETS—SHEET 5.

Inventor:
Seraphine F. Bauwens.
By Emery, Booth, Janney & Varney.
Attys.

UNITED STATES PATENT OFFICE.

SERAPHINE F. BAUWENS, OF CHICAGO, ILLINOIS, ASSIGNOR TO WIREBOUNDS PATENTS COMPANY, OF KITTERY, MAINE, A CORPORATION OF MAINE.

WIREBOUND-BOX MACHINE.

1,408,336.  Specification of Letters Patent.  Patented Feb. 28, 1922.

Application filed May 29, 1919. Serial No. 300,728.

*To all whom it may concern:*

Be it known that I, SERAPHINE F. BAUWENS, a citizen of the United States, residing in Chicago, in the county of Cook, State of Illinois, have invented an Improvement in Wirebound-Box Machines, of which the following is a specification.

This invention relates to machines for use in making wirebound boxes, box-blanks or parts, and particularly to means for severing binding wire applied to box parts.

The nature of the invention will be best understood by reference to one form of machine containing an embodiment thereof which is shown for illustration in the accompanying drawings.

The machine selected for illustration is a wirebound box blank machine adapted for uninterrupted operation in making a number of wirebound box blanks in succession, continuous lengths of binding wire being applied to successive assemblies of blank materials; and the purpose of the invention, in such illustrative embodiment, is to sever the binding wire between successive blanks.

Obviously the invention is not limited in its application to machines of this particular type.

The illustrative machine comprises, between supporting side frames 1, a gang of staplers 2 and a relatively movable work-holder 3 for assembled cleats and side material for a blank or a succession of foldably related box sections.

The work-holder 3 is in the form of a circulating conveyer having work-positioning means for a succession of blanks; said conveyer comprising a pair of endless link chains appropriately channel-shaped to receive the box cleats and having spacer blocks 4 affixed thereon at intervals for determining proper relationship of adjacent box sections, or of the cleats and side material for a blank, and for spacing successive blanks apart.

Box sections are successively assembled on the conveyer chains by placing cleats thereon in pairs and laying sheets of side material thereacross, or if desired an integral sheet for a blank may be placed upon a succession of cleats.

Figure 1:
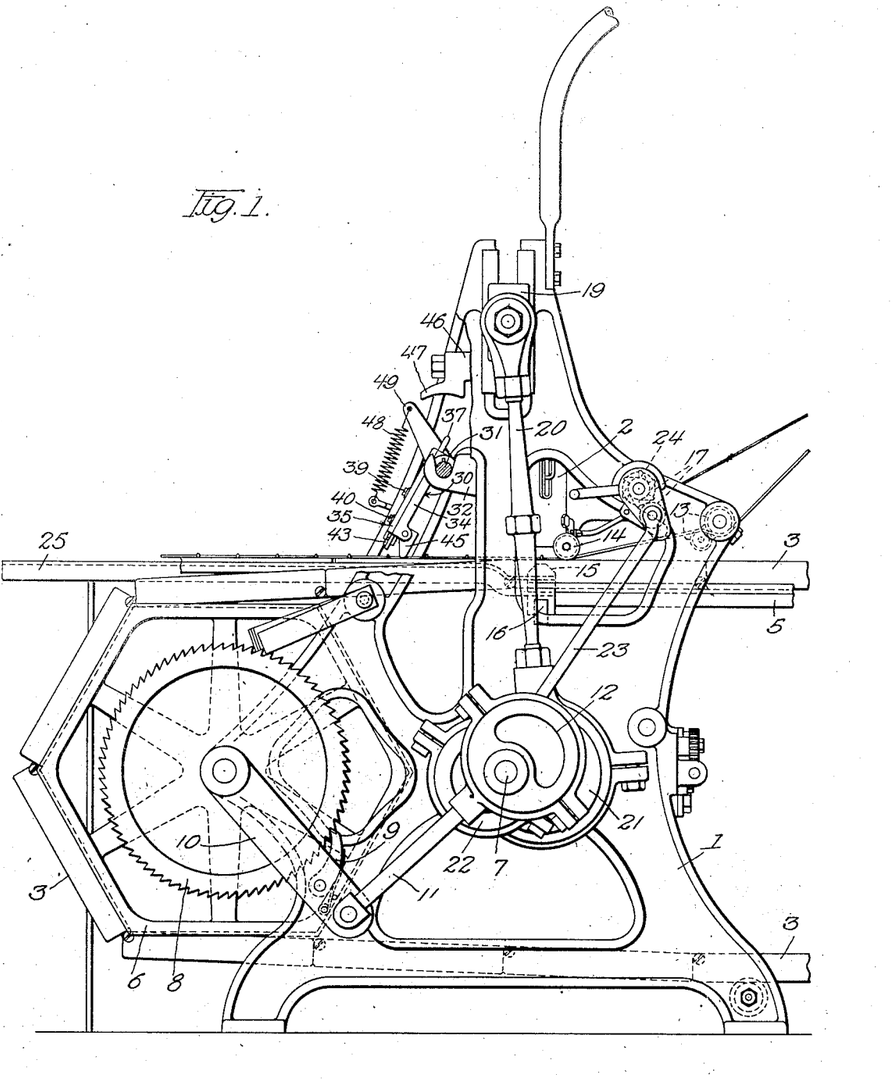
Fig. 1 is a side elevation of the illustrative box blank machine, omitting the receiving end portion of the work conveyer.

The conveyer chains run on horizontal guide-rails 5 and at the delivery end of the machine are trained around the driven sprocket wheels 6, which may be rotated from the main shaft 7 by any suitable means, for instance by the ratchet feed mechanism shown in Fig. 1, comprising a ratchet wheel 8 and a coacting feed pawl 9 carried by a lever 10 which is operated through a rod 11 from an eccentric 12.

With the type of feed mechanism described, the conveyer and work thereon will be advanced to the staplers step-by-step, in alternation with the stapling operations; and associated with said mechanism there may be provided any suitable devices, not necessary to be illustrated, for varying, adjusting or controlling the feed, for skipping the stapling operation at the box joints, for manually independently rotating the conveyer sprockets for initial work adjustment or otherwise, and for braking the conveyer sprockets at the completion of each feed step.

Suitable means for these purposes are shown, for example, in the patent to Thompson, No. 1,258,625, dated March 5, 1918, and in my co-pending application filed March 22, 1919, Ser. No. 284,332.

As the work progresses beneath the staplers, a plurality of continuous lengths of binding wire, drawn from suitable supply reels, not shown, are introduced in proper relation to the box sections to be stapled thereto, the wires being led between the rollers 13 and thence under the rollers 14 attached to the stapler bodies, and are pulled along with the work by virtue of their attachment thereto at preceding points. Certain of the wires aligned with the box cleats are stapled through the sheets thereto, so as to connect such wires to both the sheets and cleats and secure the latter together; and intermediate wires are or may be stapled to the sheets alone and clinched on their under sides by the coaction of the staple drivers with anvils 15 supported on the cross frame member 16.

The staplers 2 may be of the type disclosed, for example, in the aforesaid patent to Thompson No. 1,258,625, dated March 5, 1918, comprising combined staple formers and drivers adapted at every operation to cut and form staples from staple stock wire, fed thereto by rollers 17, and to drive the same over the binding wires into the work. Said staplers are mounted on the stationary cross-head 18 and are actuated by the vertically reciprocating cross-bar 19 working in guides of the side frames 1 and operated by a pitman 20 from eccentric 21 on the main shaft, there being similar operating connections at either side of the machine. The feed rollers 17 for the staple stock wires are also operated from the main shaft by eccentric 22 and connecting rod 23 working a pawl-and-ratchet device 24 for rotating the rollers intermittently.

With the intermittent feed type of machine described, a staple is formed and driven at every reciprocation of the cross-head 19, or so called "upper stitcher bar", the staple being driven on the downward stroke thereof, while the material is momentarily at rest, the extent of movement of the material between the successive operations of the staplers determining the spacing between successive staples.

It will be understood that this specific machine is but one illustrative example of a machine to which my invention is applicable in which box parts are successively wired together by effecting relative progression between work and fastener-setting mechanism, and in which desired relative positions of adjacent box parts are properly maintained during the wiring of such parts together; various constructions and arrangements for these functions being already known to the art.

Referring again to the illustrative machine, as the work leaves the stapling mechanism the finished blank may be stripped from the conveyer chains onto table bars 25, and while still on the conveyer chains the wires connecting one blank and another may be severed by the automatic cutting mechanism presently to be described.

The binding wires are intended to be severed between one blank and the next in such manner as to leave free wire ends projecting beyond the ends of the blank so that when the blank is folded into box form these projecting wire ends will meet to be twisted together for closing the box. To suit this purpose the materials for succeeding blanks are suitably spaced to leave between them a sufficient length of wire to provide, when severed, the desired free ends. Such spacing may be effected, for example, by placing the group of work-positioning devices or spacer-blocks for each section somewhat ahead of the group for the next section, or, if movable spacer blocks be employed, or if the work is fed otherwise than by a traveling former or work-holder, by inserting elongated spacers between successive blanks.

Mechanism for severing the binding wires is arranged at the delivery side of the wire-applying and stapling mechanism, preferably in sufficient proximity to the latter to sever the wires while the work is still on the traveling work-holder but at a suitable distance from the stapling plane to insure the driving of a plurality of successive staples, three for instance, in each blank before severing the wires; thus the wires will be firmly held against slipping during the severing operation.

The illustrative wire severing mechanism comprises a gang of individual wire cutters 30, corresponding in number and position to the staplers; said cutters are arranged for actuation by the staplers or the reciprocatory actuating bar 19 thereof, but are normally maintained in inoperative or inactive position and adapted upon presentation of a cutting space between blanks, or other pieces of work to be cut apart, to enter said spaces and engage and cut the wires, including those connecting successive cleats although still in the work-holder.

As shown, the cutters are hung from a rocker shaft 31 so as to drag over the work and be held thereby in non-cutting position, and so as to drop or swing into a space between blanks when presented, and after the wire-severing operation, to be again raised to normal non-cutting position by the advancing movement of the following blank. This is an especially desirable arrangement for work-control of the cutting operation in accordance with relative progression of the work; in such arrangement the swinging cutter bodies, or at least one of them if the several cutter-bodies are as shown splined to shaft 31, typify a controller responsive to the passage of each of successively passing blanks or other pieces of work to be cut apart.

The shaft 31 is supported by notched arms 32 projecting from brackets 33 adjustably bolted to the stationary cross-head 18: a pair of said supporting arms 32 embracing each cutter. The supporting brackets may be shifted laterally to adjust the positions of the cutters, the latter as stated being splined to the shaft.

Figures 5, 6:
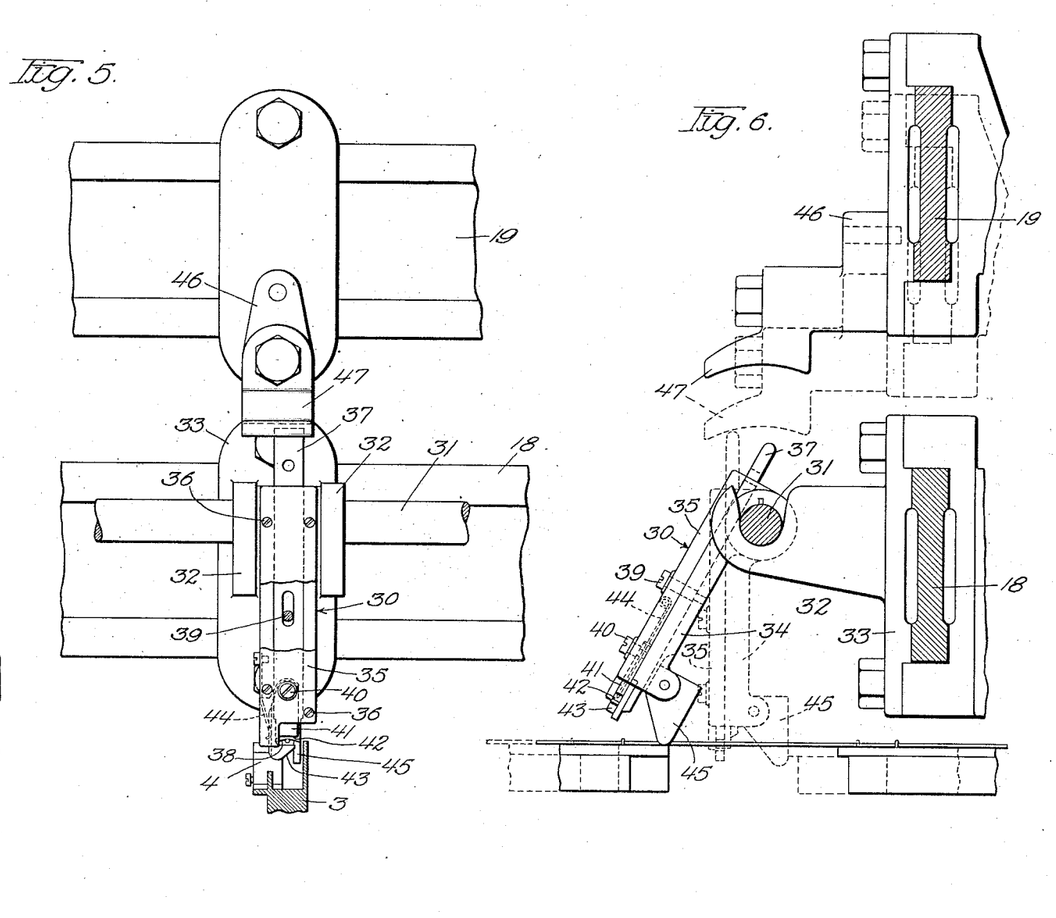
Fig. 5 is an elevation of one of the binding wire cutters viewed from the delivery end of the machine.
Fig. 6 is a side view of said cutter.

An individual cutter is constructed as follows: Its swinging body or holder is composed of a channel-faced part 34 and removable face-plate 35 secured thereto by screws 36. The holder contains and guides a freely vertically slidable bar or plunger 37 projecting beyond both ends of the holder, and having at its lower end a notched shearing edge 38. A pin 39 projecting from said face plate into a slot in the bar limits the up and down movement of the bar within the holder. Pivotally attached by pin 40 to the lower end of the face plate of the holder is a spring-pressed member 41 having a lateral notch 42, the lower edge of which notch is a shearing edge, and having a beveled lower end 43. Said element is resiliently held by spring 44.

Each of the cutters if the cutters are independently mounted carries a gauge plate 45 mounted on the lower part of the cutter body for a purpose later to be explained. When the cutters are splined to the rocker shaft, the outer cutters alone preferably are provided with gauge plates.

For operating the cutters, there is secured to cross-head 19, directly above each cutter, a bracket 46 having an operating foot 47 which reciprocates vertically with the cross-head and operates the cutter each time the bar or plunger 37 is presented beneath the foot 47. The under surface of the foot 47 is arcuate for actuating the cutter at different angles.

Figure 2:
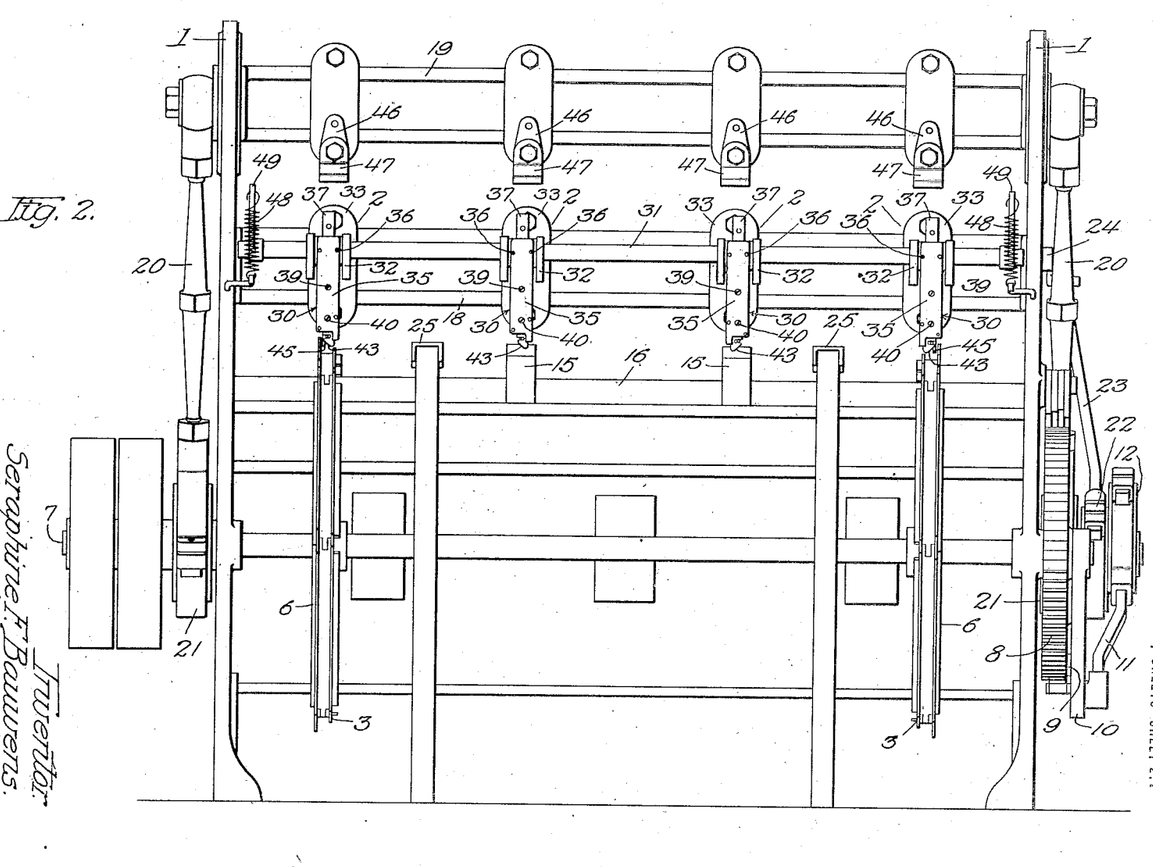
Fig. 2 is an end elevation, looking at the delivery end.

As shown in Fig. 6, in the normal position in which the cutter is held by the box materials on which it rides, the upper end of the plunger bar 37 is out of the path of movement of the operating foot or depresser 47. In this position the nose of the gauge 45 rests on the box materials, and holds the shearing devices out of contact with the work. When, however, a space between box blanks presents itself, the cutter swings downward either by its own weight or by means of a spring 48 (Figs. 1 and 2) which is connected with an arm 49 on the rocker shaft. This swinging is limited by the gauge 45 coming into contact with the advance edge of the oncoming blank, and obviously the gauge, according to its selected size, predetermines the relationship of the cutter to the work at the time of a wire-severing operation. In this downward swing of the cutter, the wire to be severed engages the lower end of the plunger bar and lifts said bar, while the nose-shaped element 41, by engagement of its inclined edge 43 against the side of the wire, snaps under and lodges the wire in the cutting notch 42. By the change of inclination of the cutter and elevation of the bar 37, the upper end of said bar is brought into the path of movement of the operating foot 47.

The wire is positioned between the shearing edge of notch 42 and coacting shearing edge 38 of the plunger bar, sustaining the latter in relatively elevated position. When the cross-head 19 descends, the operating foot 47 strikes the upper end of the plunger bar, forcing it down and severing the wire.

In connection with Fig. 6, the diagrammatic views Figs. 7, 8, 9 and 10 will clearly explain the operation.

Figure 7:
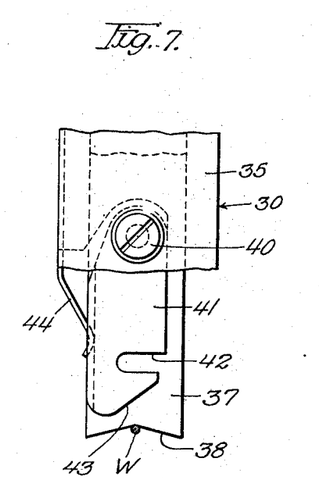
Figs. 7, 8, 9 and 10 are diagrammatic views illustrative of the operation of a cutter.

Fig. 7 indicates the position of the parts when in the downward swing of the cutter the bar 38 has just engaged and commenced to be lifted by the taut binding wire W.

Figure 8:
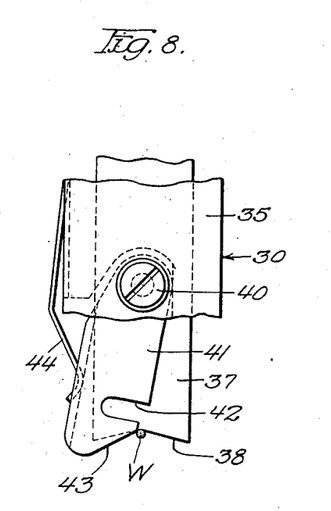
Figure 9:
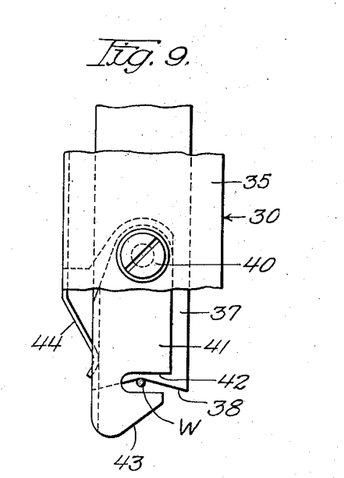

Continued descent of the parts, the cutter holder and element 41 moving downward relatively to the bar 37, is represented in Fig. 8, where the wire W is displacing the element 41. Thus the parts are brought to the position shown in Fig. 9, the notch 42 snapping over the wire.

Figure 10:
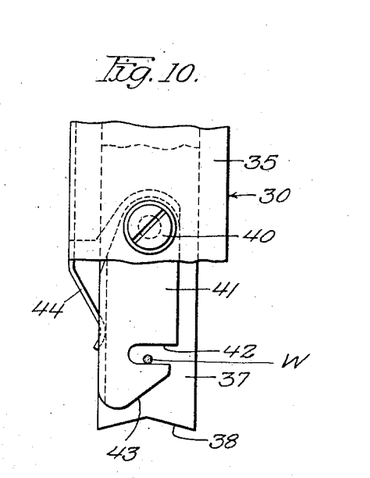

Fig. 10 shows the wire severed by the downward motion of the bar 37.

After the severing operation, which in a machine of the illustrative type occurs during the rest of the work, the next movement of the work during the upward motion of the stitcher bar 19 causes the return of the cutters to normal position, by pushing of the advance edge of the work against the gauge 45.

Among other obvious advantages of the mechanism described, the cutters will operate uniformly in relation to each of successively presented pieces of work, adjusting themselves to the work. It is not necessary that the cutters be in vertical position for operation; they will work at an inclination; so that if by reason of irregularity in work-feeding there should be variations in the position at which the cutting space is presented the cutters will accommodate themselves thereto, and will cut off the wires at the points predetermined by the gauge, for which different sizes may be substituted according to the desired point of cut off.

Figures 3, 4:
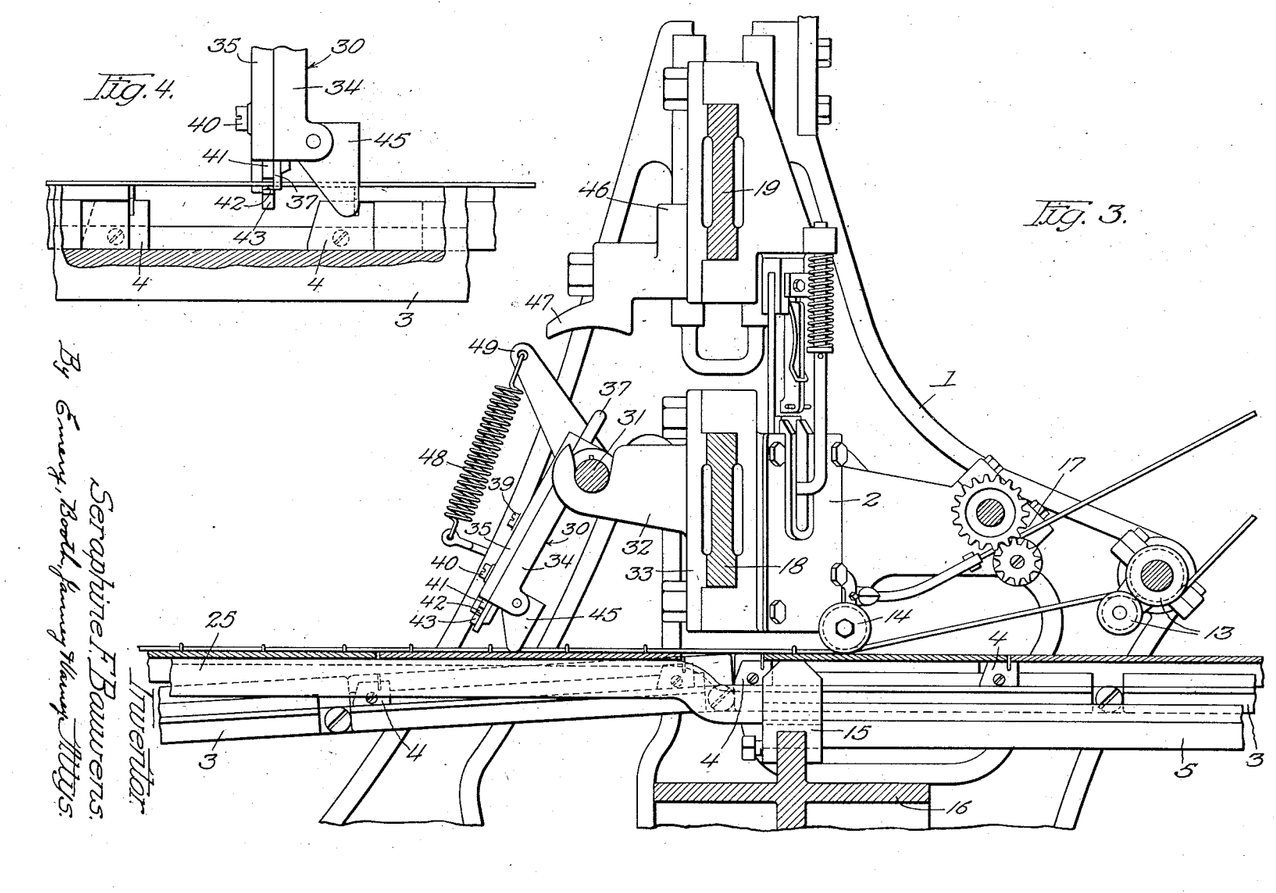
Fig. 3 is an enlarged view, in longitudinal vertical section, of a portion of the machine.
Fig. 4 is a detail side view of a cutter in operating position.

By reference to Figs. 4 and 5, it will be observed that the marginal cutters operate in the vertical plane of the cleats and within the confines of the channelled work-holder 3. As the cutter swings back it will clear the rear spacer 4 of one blank and be held from the spacer of the next blank by the gauge 45, the latter being the only element which has to pass between the spacer blocks and higher outer flange of the work-holder.

For convenience of illustration the spacer blocks are omitted from Fig. 6, but are shown in Fig. 4, which is a side view of the marginal cutter seen from the side of the machine nearest the observer, the high flange of the channel of the work holder being omitted.

Figure 11:
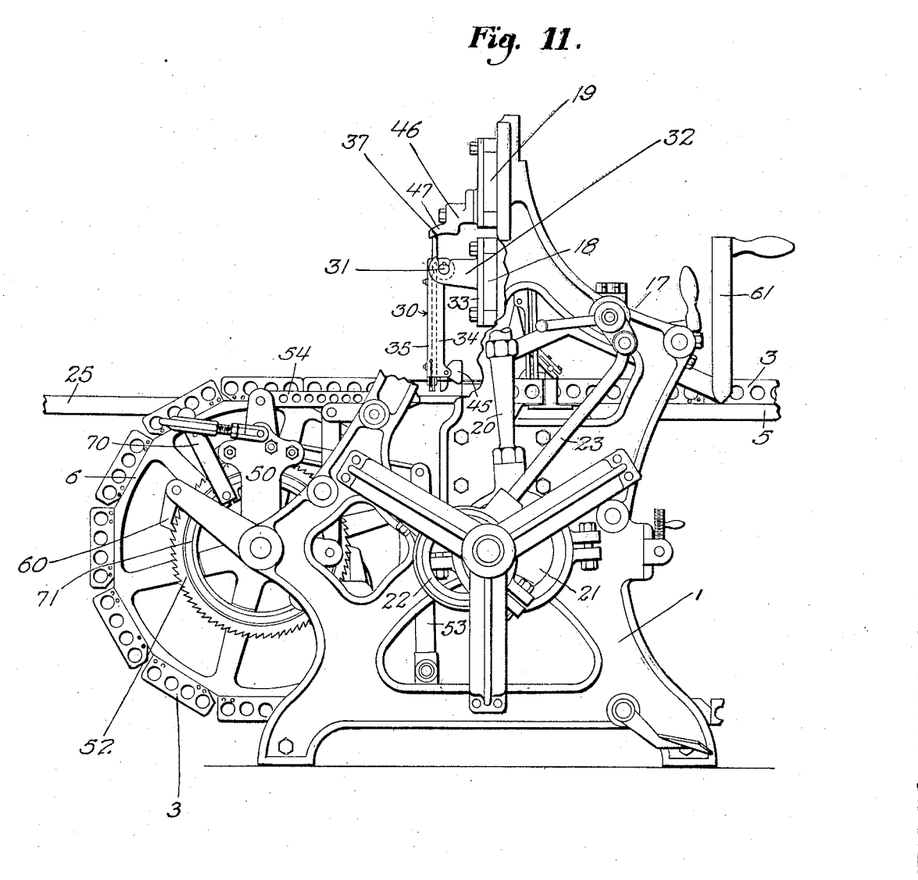
Figs. 11 and 12 are side and end elevations of another machine embodying my invention.
Figure 12:
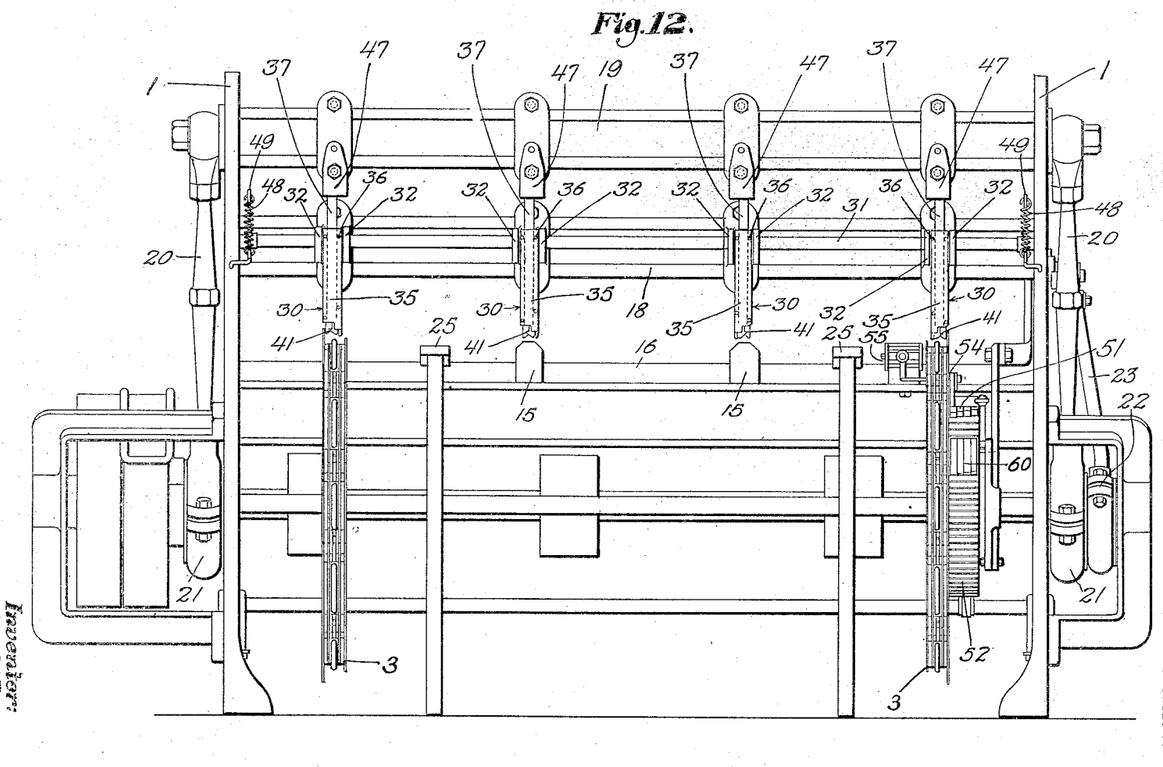

In Figs. 11 and 12 I have represented an embodiment of my invention in a box-blank machine having automatic staple positioning means such, for example, as the means particularly set forth in my application filed March 22, 1919, Ser. No. 284,332, to which application reference is made for a fuller description. Briefly stated, the specific staple-positioning means comprises a regulable ratchet-feed, controlled from elements located with reference to desired stapling points on the work to cause the conveyer to present such points to the stapling mechanism. The lever 50 carrying the feed-pawl 51 for the ratchet wheel 52 is connected with lever 53 actuated from a cam on the main shaft, there being provision for lost motion between the cam and lever whereby the backward stroke of the lever 50 and consequently its effective working stroke may be variably determined. The lever 50 is connected by rod 54 with a stop-mechanism 55 of the pawl-and-rack type, controlling the stroke of the ratchet driving lever 50, and said stop mechanism is in turn controlled by the successively presented spacer-blocks on the conveyer to cause certain feed stops to locate staples at definite positions relative to said blocks, including the first and last staples of a blank.

With this mechanism, every blank will be uniformly positioned for the application of the first staple, and, inasmuch as the normal feed steps are regular, will be uniformly positioned for the cutting operation; an advantage is, therefore, that wires between blanks will be cut at uniform distances from the first staple, as predetermined by the gauge.

The automatic wire-severing means shown in Figs. 10 and 11 is substantially similar to the means previously described, with minor differences in form.

In Figs. 11 and 12, 60 is a pawl operated from hand lever 61, for manually advancing the conveyer independently. 70 is a connection with the ratchet driver for operating a conveyer brake 71.

Obviously the present invention is not limited to the particular embodiment shown and described, but may be variously embodied and the particular construction shown may be variously modified as will appear to those skilled in the art. Furthermore, it is not indispensable that all the features of the invention be used conjointly since they may be used to advantage in various different combinations and sub-combinations.

I claim:

1. A machine for use in making wire-bound boxes comprising, in combination, means to secure binding wire to box parts; means for relatively moving work and wire-securing means for progressively subjecting the work to the wire-securing operation; and automatic means controlled in accordance with relative progression between each of successive pieces of work and the wire-securing means for severing binding wire uniformly with reference to edges of said successive pieces of work.

2. A machine for use in making wire-bound boxes comprising, in combination, means to secure binding wire to box parts; means for relatively moving work and wire-securing means for progressively subjecting the work to the wire-securing operation; and automatic means successively controlled by each of successive pieces of work for severing binding wire uniformly in reference to edges thereof.

3. In a machine of the class described having relatively movable work and wire-securing means by which binding wire is progressively applied to the work, automatic means to sever binding wire at spaces in the work, said severing means controlled by the work for positioning in reference thereto.

4. In a machine of the class described having relatively movable work and wire-securing means by which binding wire is progressively applied to the work, means dragging on the work adapted to enter spaces therein and sever binding wire between successive pieces of work.

5. A machine for use in making wire-bound boxes comprising in combination, means to secure binding wire to box parts and means to sever said wire between box parts at a predetermined point relative to the edge of a box part.

6. A machine for use in making wire-bound boxes comprising, in combination, means to secure binding wire to box parts; means for relatively moving the box parts and wire-securing means; and means controlled by said relative movement to sever the binding wire at a predetermined point relative to the edge of a box part.

7. A machine for use in making wire-bound boxes comprising, in combination, means to secure binding wire to box parts; means to cause relative progression between said securing means and the box parts; and means to cut said wire between box parts at definitely selected points relative to edges of box parts.

8. A machine for use in making wire-bound boxes comprising, in combination, means to secure binding wire to box parts; automatic means for cutting said binding wire; and work-engaging means controlling said cutting means to position the same for a cutting operation at a predetermined point in reference to the edge of a box part.

9. A machine for use in making wire-bound boxes comprising, in combination, means to secure binding wire to box parts; automatic means for cutting said binding wire; work-engaging means controlling said cutting means to position the same in reference to the edge of the work at the time of a cutting operation.

10. A machine for use in making wire-bound boxes comprising, in combination, means to secure binding wire to box parts; means to cause relative progression between the work and wire securing means; means for severing binding wire between successive pieces of work; and means for definitely locating the point of severing with respect to the adjacent edge of a piece of work.

11. A machine for use in making wire-bound boxes comprising, in combination, means to secure binding wire to box parts, and means to sever said wire between box parts comprising a pivoted cutter adapted to ride on the box part and swing into cutting position between box parts.

12. A machine for use in making wire-bound boxes comprising, in combination, means to secure binding wire to box parts and means for automatically cutting said wire between a plurality of successive pieces of work, comprising a cutting device adapted to ride on the work and drop into spaces therebetween.

13. A machine for use in making wire-bound box blanks comprising, in combination, means to secure binding wire to successive box blanks and means adapted to ride on the blanks and controlled by their passage through the machine for severing the wires therebetween.

14. A machine for use in making wire-bound boxes comprising, in combination, means to secure binding wire to box parts; means to cause relative progression between work and wire-securing means; and cutting means riding upon the work adapted upon passage of a piece of work to drop into cutting position and sever the binding wire.

15. A machine for use in making wire-bound boxes comprising, in combination, fastener-setting mechanism to secure binding wire to box parts; means to cause relative progression between the work and fastener-setting mechanism; and automatic wire-severing means arranged for actuation by said mechanism but controlled for action by the work.

16. A box blank machine comprising, in combination, fastener-setting mechanism to secure binding wires to box parts; means to cause relative progression between said mechanism and the work; and means adapted to be actuated by said mechanism for severing said attached wires between blanks including means controlled by the work for locating the point of severing.

17. A machine for use in making wire-bound boxes comprising, in combination, means to secure binding wire to box parts and means to sever said wire between box parts including a gauge for definitely determining the point of cut-off relative to the edge of a box part.

18. A machine for use in making wire-bound boxes comprising, in combination, means to secure binding wire to box parts and means to sever said wire between box parts including a gauge adapted to engage the edge of a box part and position the point of cut-off relative to said edge.

19. A machine for use in making wire-bound boxes comprising, in combination, means to secure binding wire to box parts and means to sever said wire between box parts, including a gauge carried thereby and adapted to successively position said severing means for a cutting operation relative to the edge of each of successive pieces of work.

20. A machine for use in making wire-bound boxes comprising, in combination, means including fastener-setting mechanism for applying binding wires to box parts; means to cause relative progression between said mechanism and the work; and means including a gauge controlled by the passage of the work through the machine for severing said attached wires at a predetermined distance from the edge of a box part.

21. A machine for use in making wire-bound boxes comprising, in combination, fastener-applying means for securing wire to a box part; work holding means to present a box part to the fastener-applying means; a gauge to measure the length of wire relative to the edge of a box part; and wire severing means to sever the wire at the point predetermined by said gauge.

22. A machine for use in making wire-bound boxes comprising, in combination, means to secure binding wire to box parts; means for relatively moving the box parts and wire-securing means; an automatic cutter to sever the binding wire; and a gauge definitely determining a desired relationship between a box part and the cutter at the time of a severing operation.

23. A machine for use in making wire-bound boxes comprising, in combination, means to secure binding wire to box parts; means for relatively moving the box parts and wire-securing means; and automatic means to sever the binding wire at a predetermined point relative to a box part edge, including a gauge and a cutter operable only in a given relationship between the gauge, cutter and box part edge.

24. A machine for use in making wire-bound boxes comprising, in combination, means to secure binding wire to box parts; work-holding means to present box parts to the wire-securing means; wire severing means; and gauging means carried by said severing means to determine the point at which the wire is to be severed in relation to a box part edge.

25. A machine for use in making wire-bound boxes comprising, in combination, means to secure binding wire to box parts; work-holding means to present box parts to the wire-securing means; wire severing means; and gauging means adapted for automatic positioning against a box part for determining the point at which the wire is to be severed.

26. A machine for use in making wire-bound boxes comprising, in combination, means to secure binding wire to box parts; means to cause relative progression between the work and wire-securing means; and binding wire cutting mechanism normally held in an inoperative position by the work and adapted to be released from its normal position upon the passage of a piece of work and to assume an operative position at a predetermined distance from the edge of an oncoming piece of work.

27. A machine for use in making wire-bound boxes comprising, in combination, means to secure binding wire to box parts; means to cause relative progression between the work and wire-securing means; wire-cutting means controlled by the work to assume operative position at desired intervals in the work; and automatic means for operating the same when in operative position.

28. A machine for use in making wire-bound boxes comprising in combination, means to secure binding wire to box parts; means to cause relative progression between the work and wire securing means; automatic wire-cutting means; and a detector contacting with the work for causing the cutting means to be maintained in ineffectual position during the passage of the work and to assume an operative position below the wire in a space between successive pieces of work.

29. A machine for use in making wire-bound boxes comprising, in combination, fastener-setting mechanism to secure binding wire to box parts; means to cause relative progression between the work and fastener-setting mechanism; the machine being organized for wiring successive pieces of work; and automatic means self-adjustable to each of successive pieces of work to sever binding wire uniformly on such pieces.

30. A machine for use in making wire-bound boxes comprising, in combination, fastener-setting mechanism to secure binding wire to box parts; means to cause relative progression between the work and fastener-setting mechanism; and cutting means adapted to be positioned by the work for actuation by said mechanism.

31. A machine for use in making wire-bound boxes comprising, in combination, means to secure binding wire to box parts; means for relatively moving the box parts and wire-securing means; and cutting means for severing said binding wire, said cutting means normally held out of cutting position by the work and adapted to move into cutting position upon presentation of a cutting space in the work.

32. A machine for use in making wire-bound boxes comprising, in combination, means to secure binding wire to box parts; cutting means to sever said binding wire; means for relatively moving the work and said wire-securing and cutting means; said cutting means displaceable by the work after a cutting operation.

33. A machine of the class described comprising, in combination, means to secure binding wire to box parts; means to cause relative progression between work and wire-securing means; and cutting means adapted by force of gravity to assume operative position upon presentation of a cutting space in the work.

34. A machine of the class described comprising, in combination, means to secure binding wire to box parts; means to cause relative progression between work and wire-securing means; and a gravity-operated wire-severing means adapted to be supported by the work and caused to assume operative and inoperative positions thereby in respect to binding wire.

35. A machine of the class described comprising, in combination, means to secure binding wire to box parts; means to cause relative progression between work and wire-securing means; and wire-severing means controlled by the work to assume operative and inoperative positions in respect to binding wire.

36. A machine for use in making wire-bound boxes comprising, in combination, means to secure binding wire to box parts; cutting means for severing said binding wire; means to deliver successive pieces of work to said cutting means; said cutting means displaceable by each such piece of work.

37. A machine for use in making wire-bound boxes comprising, in combination, means to secure binding wire to box parts; cutting means for severing said binding wire; means to deliver successive pieces of work to said cutting means; said cutting means positioned for operation by each such piece of work.

38. A machine of the class described having, in combination, binding wire applying and fastening means; work-feeding means; wire cutting means and a detector or controller associated with the cutting means and adapted to bear on the work to maintain the cutting means out of operative relation thereto, and to move to another position when passing spaces in the work, said detector controlling the position of the cutting means and causing the same to move into wire-severing position when the detector passes said spaces.

39. A machine for use in making wirebound boxes comprising, in combination, fastener-setting means to secure binding wire to box parts; means to cause relative progression between work and fastener-setting means in intervals of controlled length between consecutive fastener setting operations for definitely placing particular fasteners; the machine being organized for wiring successive pieces of work and placing corresponding fasteners of the respective pieces of work at uniform distances from corresponding ends of such pieces of work; and automatic means for severing binding wire from each of successive pieces of work at uniform distances from said corresponding fasteners.

40. A cutter for a wirebound box making machine comprising a holder for a plunger bar; said plunger bar slidable therein having a lower shearing edge; and a latch-element to snap under a wire having a recess to receive the wire with a cutting edge for coaction with the cutting edge of said bar.

41. A machine for use in making wirebound boxes comprising, in combination, means to secure binding wire to box parts and means to sever the binding wire between box parts comprising a pair of cutting members normally maintained above the work, one of said members being adapted to assume a position below the work and cooperate with the other member to sever the wire when the last mentioned member is lowered.

42. A machine for use in making wirebound boxes comprising, in combination, means to secure binding wire to box parts and means to sever the binding wire between box parts comprising a cutting member normally maintained above the work but adapted to assume a position below the work; a cutting member normally maintained above the work and adapted when lowered to cooperate with said first mentioned cutting member to sever a wire, and means for lowering said second cutting member.

43. A machine for use in making wirebound boxes comprising, in combination, means to secure binding wire to box parts and means to sever the binding wire between box parts comprising a swinging cutter member normally maintained above the work but adapted when lowered against a wire to snap in under the wire, and a cutting member normally maintained above the wire but adapted to be lowered against the wire and sever it by coaction with said swing cutter.

44. A machine for use in making wire bound boxes comprising, in combination, means to secure binding wire to a succession of box assemblies; and means to sever the binding wire between box assemblies, said machine being adapted to operate without interruption upon a succession of box assemblies and sever the binding wire uniform distances from an edge of each box assembly.

In testimony whereof, I have signed my name to this specification.

SERAPHINE F. BAUWENS.